Dec. 11, 1945.　　　S. L. HARDIN　　　2,390,584
FISH LINE ASSEMBLY CONNECTOR
Filed March 29, 1944
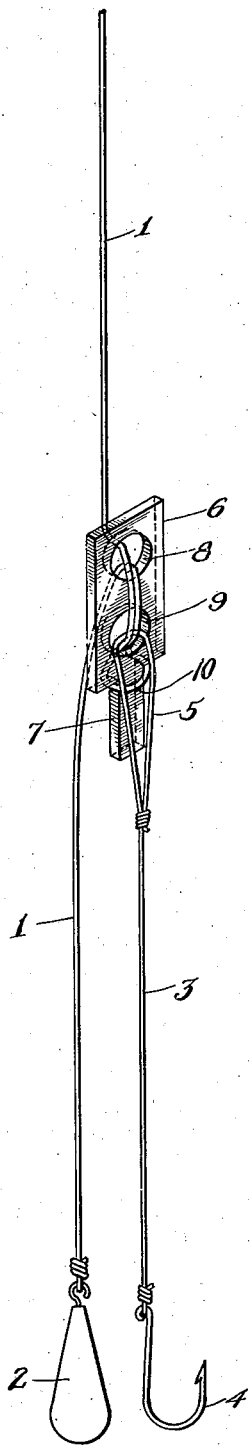

Patented Dec. 11, 1945

2,390,584

UNITED STATES PATENT OFFICE 2,390,584

FISHLINE ASSEMBLY CONNECTOR

Steven Lee Hardin, Philadelphia, Pa.

Application March 29, 1944, Serial No. 528,523

2 Claims. (Cl. 43—28)

This invention relates to the provision of a novel fish line assembly and connector for fish lines in such assembly and has for its primary object the provision of connecting means which will permit an assembly of lines in such way as to eliminate the need for knotting the lines, minimize chafing, and prevent snagging of seaweed and the like, by the connector.

It is a further object of my invention to provide a novel form of connecting member by means of which the line to which the hook is attached may be quickly and securely attached at any point, without knotting, to the line which is secured to the rod and wherein the hook line can be easily removed for drying or the like, or for the purpose of substituting a different hook.

It is a further object of my invention to provide a fish line assembly wherein the bending involved in knotting of the lines will be eliminated at the point where the line of the hook is connected to the line of the rod.

It is a further object of my invention to provide a connector which will accommodate a wide range of different size lines without slippage on the line and in which the line to be connected may also vary widely in size.

I have illustrated my invention in the accompanying drawing, wherein the figure illustrates assembly of the line secured to the rod, the line secured to the hook, and the connecting member, by means of which the said lines are connected.

Referring to the drawing, the reference numeral 1 indicates the main line which may be attached to the rod at one end and a sinker 2 at the opposite end. The reference numeral 3 indicates the hook line having the hook 4 at one end and a loop 5 at the opposite end. This latter line is frequently a gut line.

The connecting member is indicated as a whole by the reference numeral 6 and comprises an oblong rectangular main body portion having a pin 7 projecting from one end thereof, a hole 8 at the opposite end, and a hole 9 intermediate the hole 8 and the pin 7. This connector 6 as a whole is a flat, smooth, single piece member and the sides of the pin 7 do not project beyond the flat sides of the body of the connector. The connector can be of stamped or molded metal, such as aluminum, stainless steel, or the like, or if desired it can be stamped and molded from Bakelite or one of the many plastic materials available today. It should, of course, be made from material which would be substantially unaffected by salt water, so that the connector will not corrode or swell or otherwise have a surface roughened in such a way as to chafe the finishing line.

The hook line 3 is attached to the line 1 in the following manner: A bight 10 in line 1 is inserted in one direction through hole 8 of the member 6. The bight 10 is then inserted through the loop 5 of the hook line 3, then in the opposite direction through the hole 9, and finally passed around the pin 7. In the assembly thus secured, the difficulty which follows in knotting two lines is entirely avoided, with the practical result that many fishhooks are saved which are otherwise lost when the two lines become separated by reason of chafing or breakage at the knot in the usual arrangement. I have found this breakage is especially apt to occur when line 3 is a gut line, for when a gut line is knotted to the line 1, the gut will take a permanent set where bent at the knot and this frequently weakens the line at the point of the knot so that the gut will break and the hook be lost.

It is also to be observed that the difficulty incident to tying and untying knots is entirely eliminated, and much time is thus saved, for it is very simple and expeditious to form the bight in the main line and insert it through the connector and the loop of the hook line. The assembly can likewise be easily and quickly disconnected.

It will also be observed that the connector 6 is adapted to be used with a wide range of different size lines. The holes in the connector are of such size that they will accommodate any usual sized rod line 1, large or small, and the connector will not slip on the line, whatever the size. The hook line 3 also may be of any usual size and can be larger or smaller than rod line 1.

One disadvantage which I found in other connecting devices of which I am aware is that all have projections or parts which will engage seaweed and the like. In the connector which I have illustrated the sides are flat and smooth and there is nothing which can possibly hook the seaweed. This is an important advantage in such a connector.

From the foregoing description it will be readily seen that I have provided a connecting member for fish-line assembly which may efficiently and quickly be attached or detached from the hook line and will hold the hook line at any desired point on the main line without slippage and without knots.

I claim:

1. A fish line connector comprising a flat, smooth, single piece member having a pin projecting from one end thereof, a hole adjacent the opposite end of the member, and a second hole intermediate said first hole and the pin, whereby a bight of the line may be inserted in one direction through said first hole, then through a loop in the line to be connected, then in the opposite direction through said second hole, and finally passed over the pin.

2. A fish line assembly comprising a fish line having a sinker attached thereto, a second line having a hook attached to one end thereof and a loop at the opposite end, and a connector comprising a flat, smooth, single piece member having a pin projecting from one end thereof, and a hole in the opposite end, a bight in said first line extending in one direction through said hole and through the loop in the second line, a second hole in said member between the pin and the first hole, the said bight extending through said second hole in the opposite direction and finally passing over said pin.

STEVEN LEE HARDIN.